Dec. 27, 1960
G. W. LANE ET AL
2,966,021
APPARATUS FOR FORMING, FILLING, SEALING AND SEVERING CONTAINERS
Filed Dec. 20, 1955
7 Sheets-Sheet 4
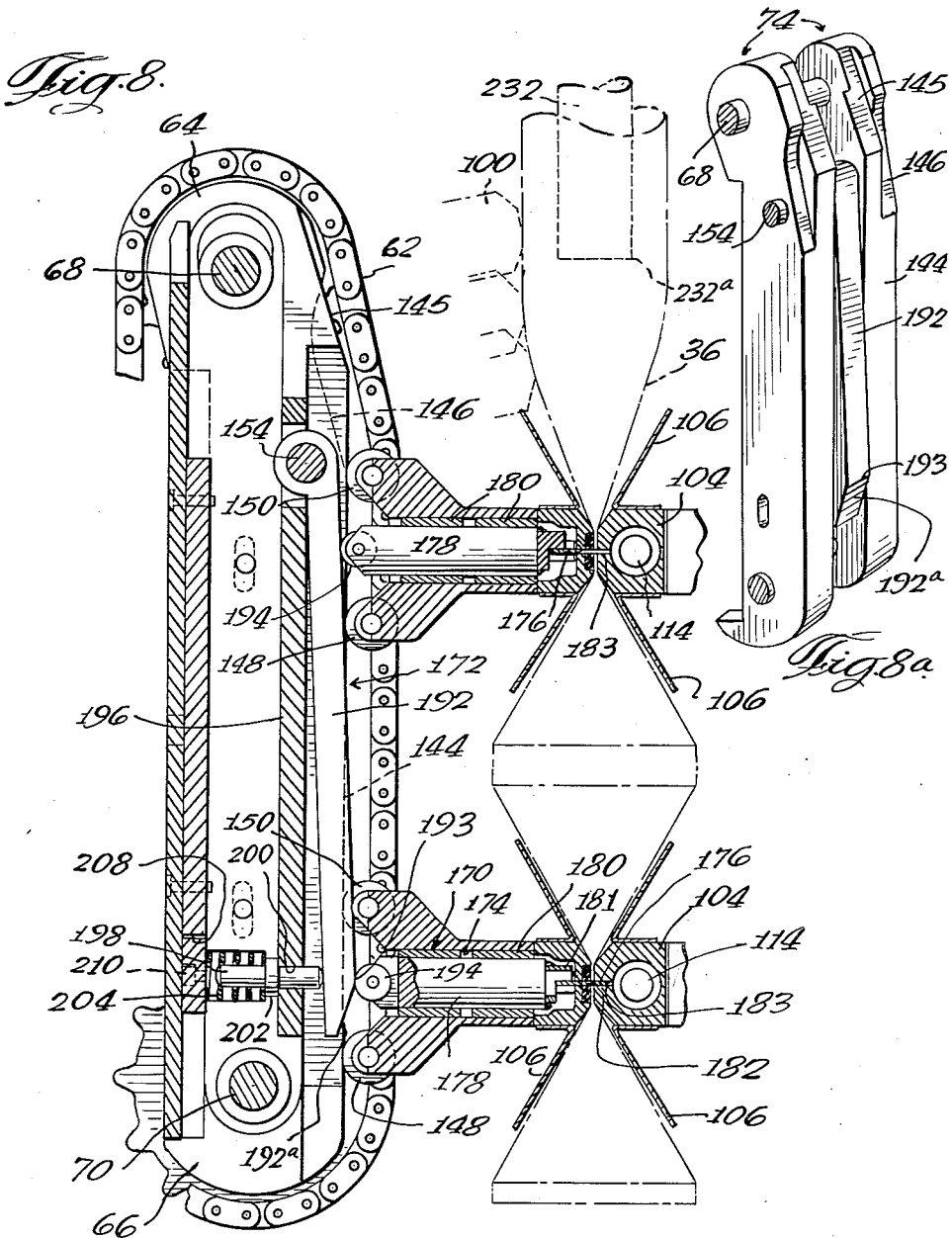
INVENTORS.
John Gayle Sawicki
George William Lane
By
Carlson, Pitzner, Hubbard & Wolfe
Attorneys

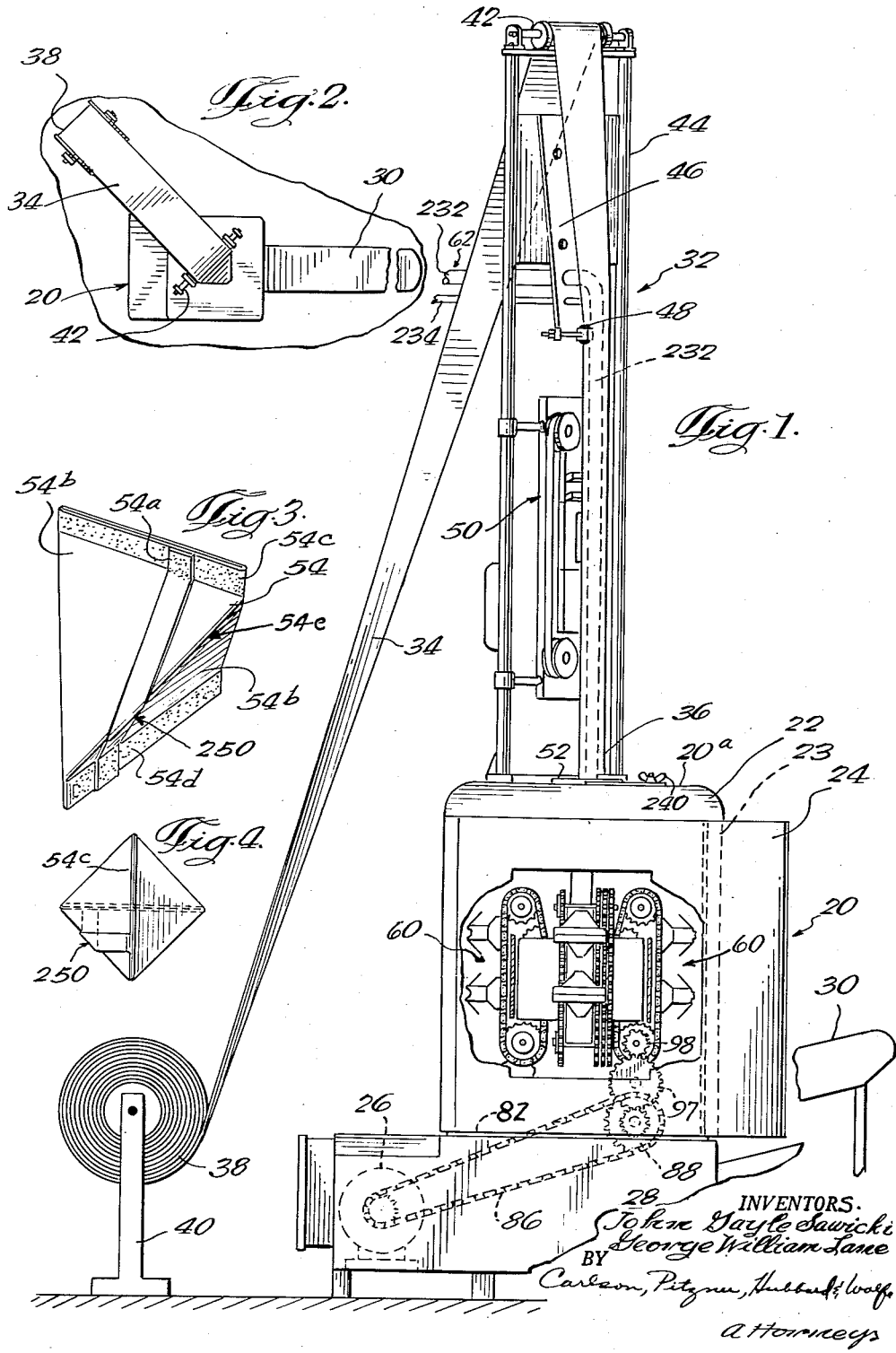

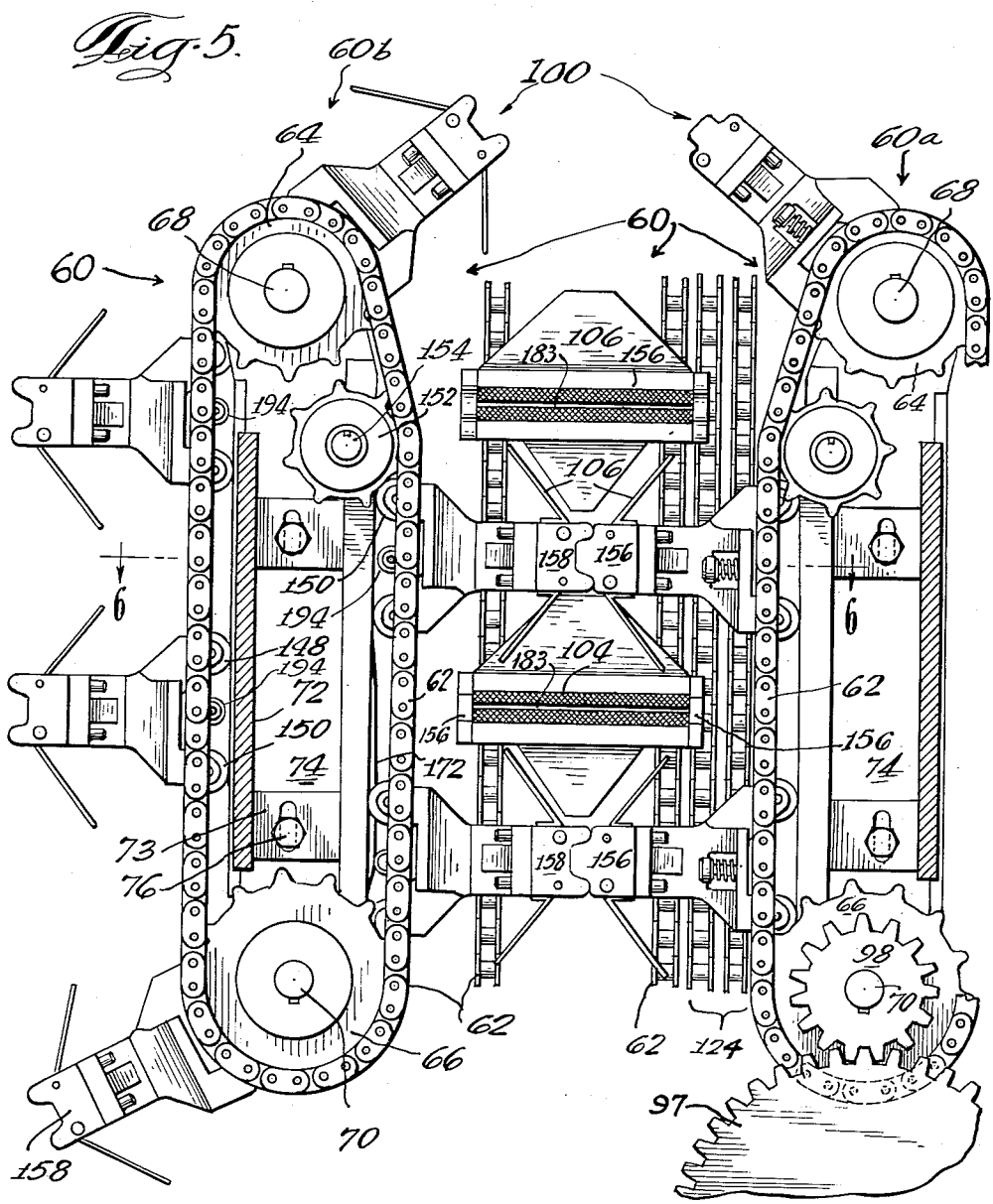

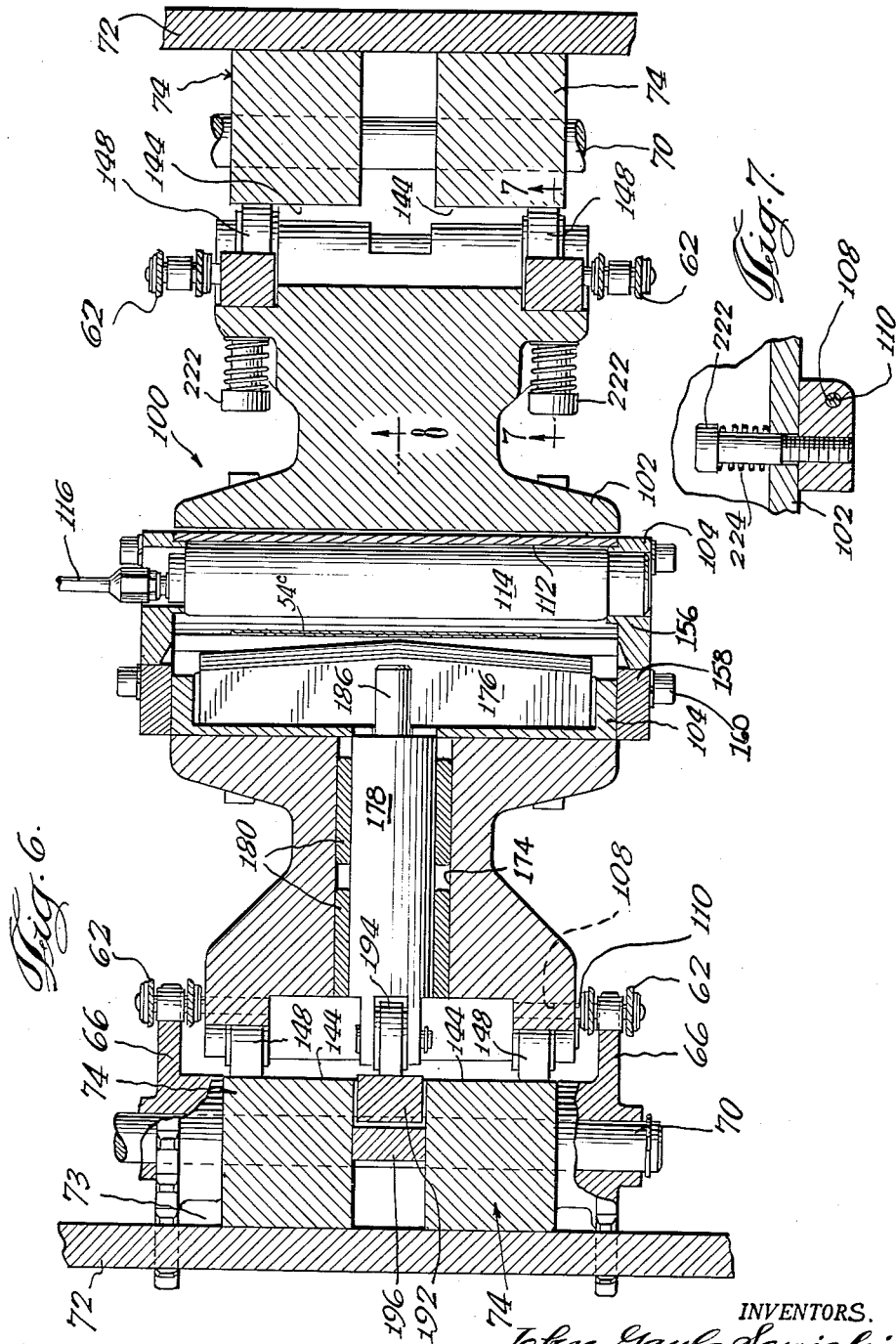

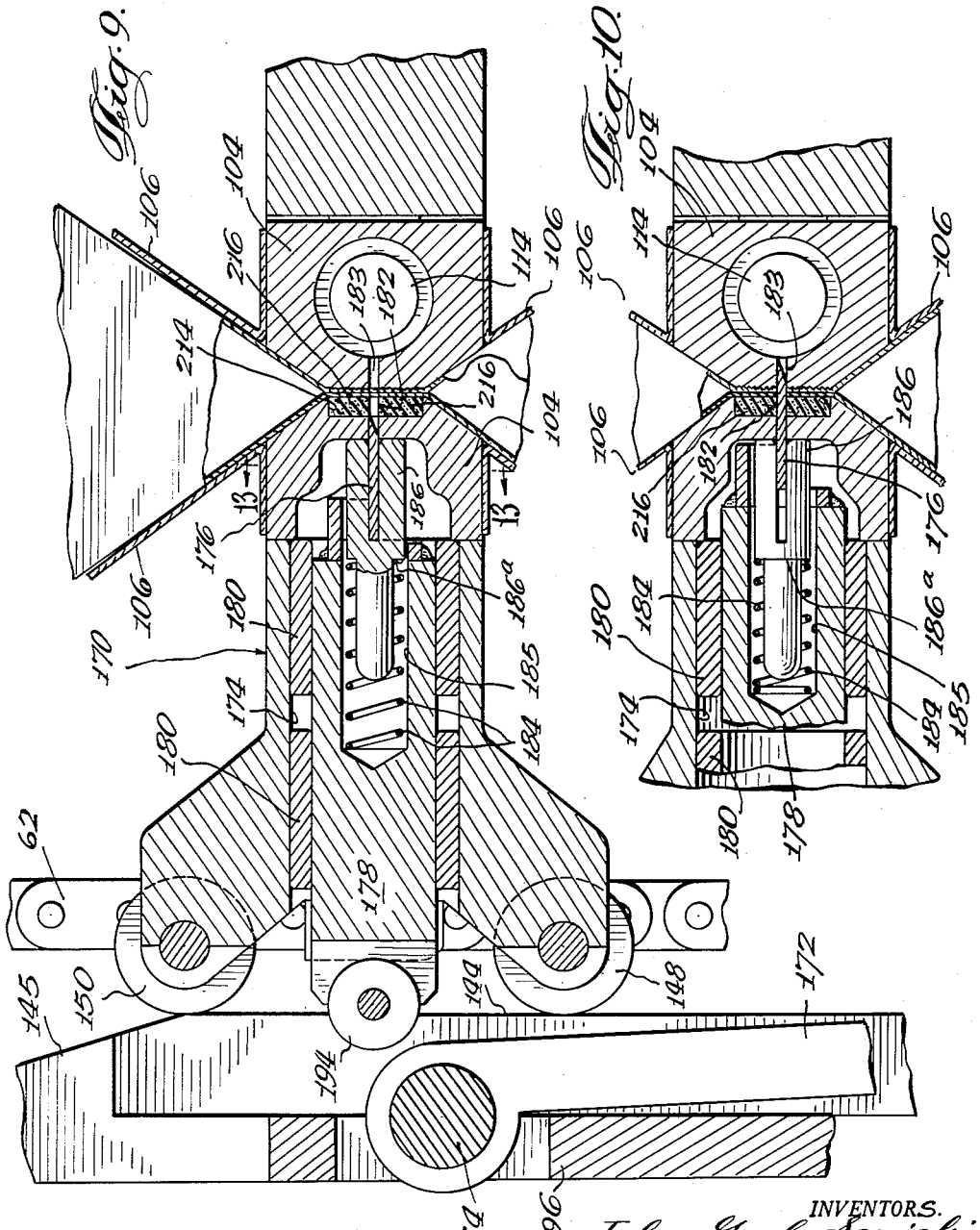

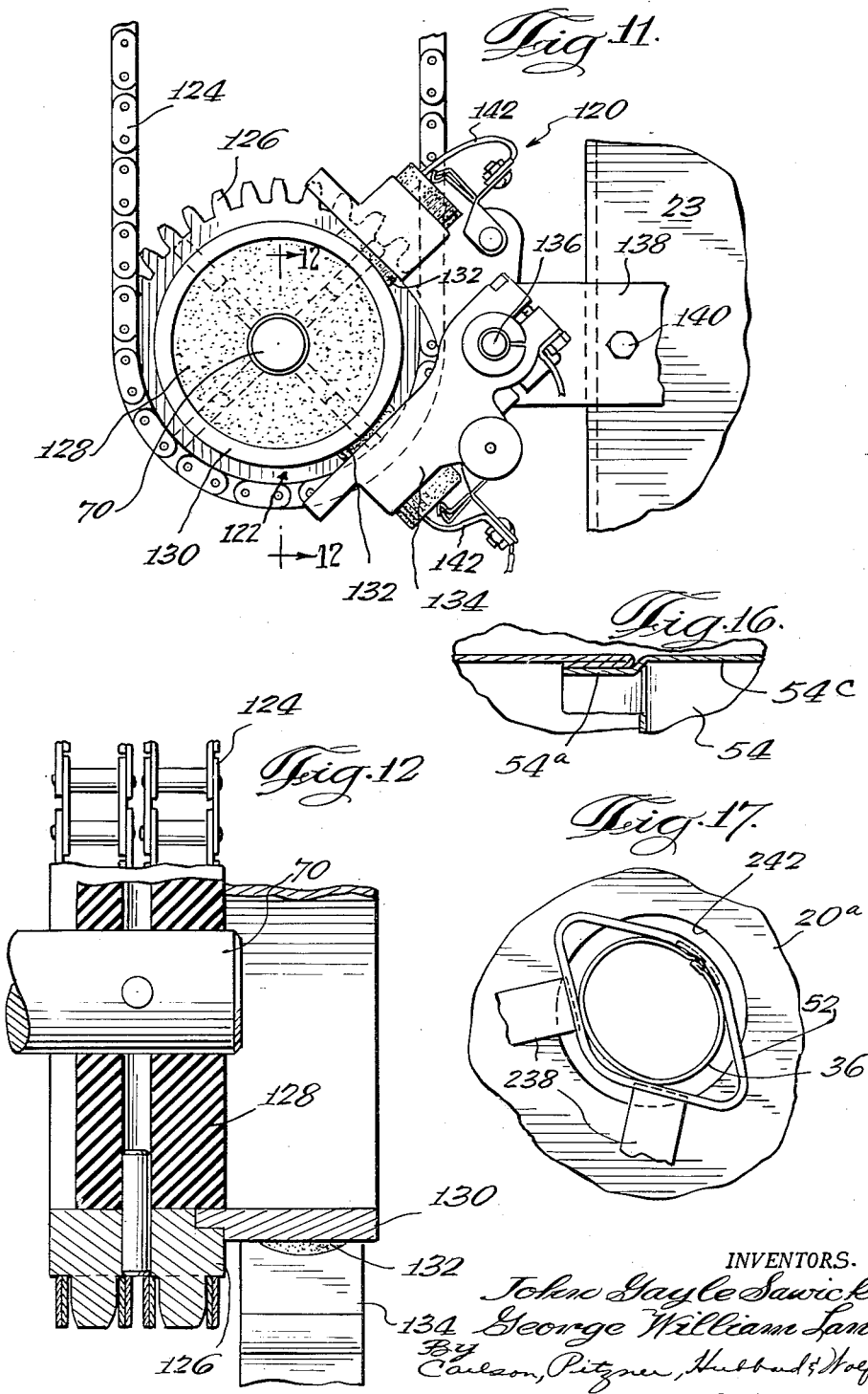

Dec. 27, 1960 G. W. LANE ET AL 2,966,021
APPARATUS FOR FORMING, FILLING, SEALING
AND SEVERING CONTAINERS
Filed Dec. 20, 1955 7 Sheets-Sheet 7
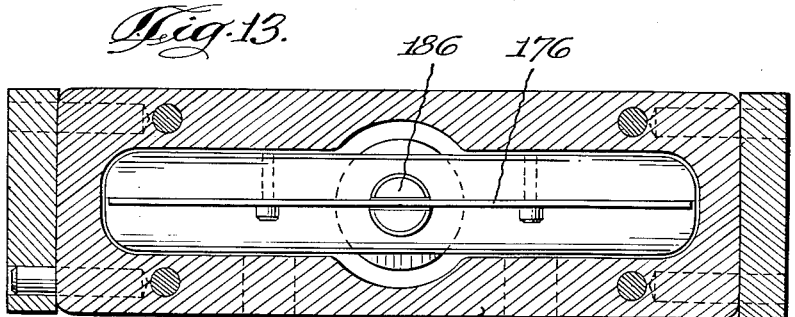
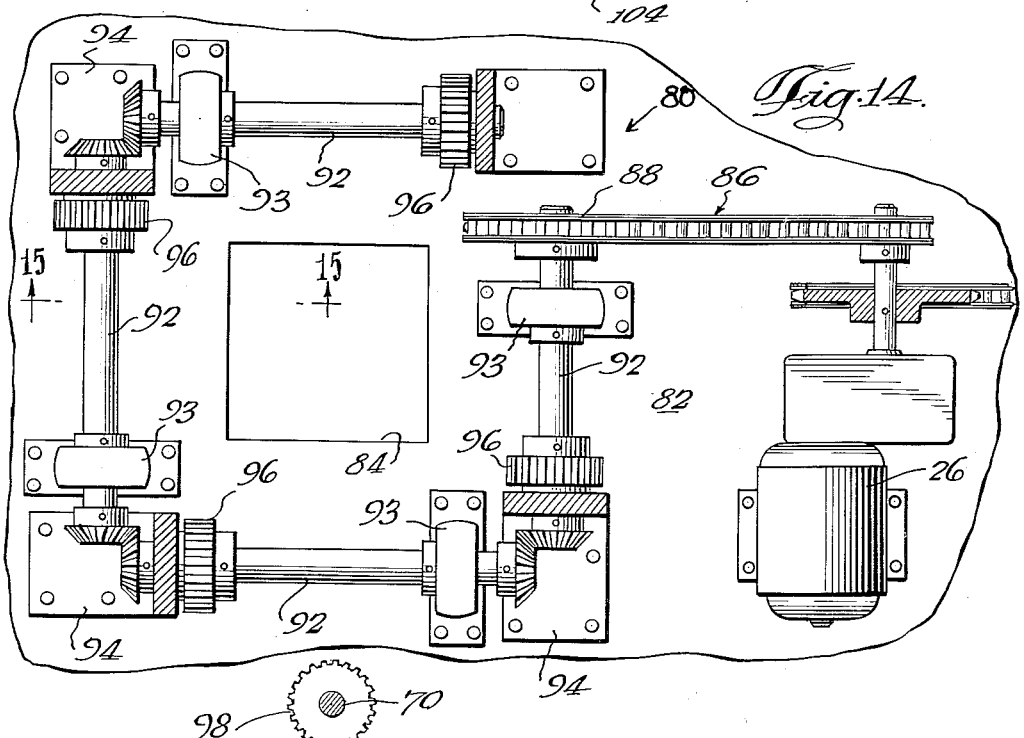
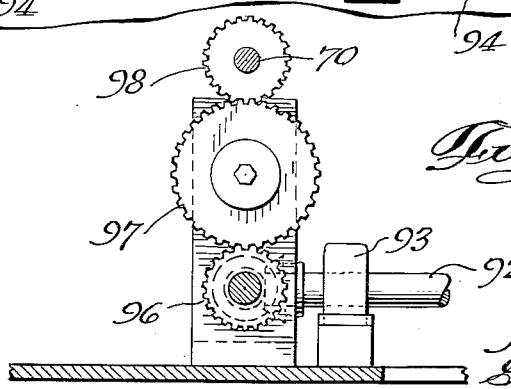
INVENTORS
John Gayle Sawicki
George William Lane
By
Carlson, Pitzner, Hubbard & Wolfe
Attorneys United States Patent Office 2,966,021
Patented Dec. 27, 1960

2,966,021

APPARATUS FOR FORMING, FILLING, SEALING AND SEVERING CONTAINERS

George William Lane and John Gayle Sawicki, Omaha, Nebr., assignors to Liqua-Pak, Inc., Omaha, Nebr., a corporation of Nebraska Filed Dec. 20, 1955, Ser. No. 554,270

14 Claims. (Cl. 53—182)

The present invention relates to containers and apparatuses for forming same, and more particularly to an apparatus for continuously forming and filling a plurality of containers using as a starting material a tube having an exterior longitudinal seam.

It is one of the general objects of the present invention to form a tetrahedron-shaped container from a tube of material having an exterior longitudinal seam so that the seam is locked snugly against the container proper to present a neat package which is absolutely sealed from leakage.

Another general object of the invention is to provide an apparatus of novel design and construction for continuously forming and filling such tetrahedron-shaped containers using as a starting material a heat sealable tube.

A more specific object is to provide such an apparatus which is adaptable to pinch and heat seal a continuously traveling tube at intervals along its length, the apparatus including opposing and cooperating tube sealing elements which are positively coordinated by novel cam means to gradually grip the tube for sealing.

A further object is to provide such an apparatus with a unitary tube sealing and container severing arrangement thus eliminating the need for an independent container separating mechanism. A related object is to provide in such an apparatus, means responsive to the position therein of the continuously moving tube for automatically severing formed and filled containers from the tube proper.

Another object of the invention is to provide a container forming apparatus of the above described type including means for obtaining accurate centering of the tubular starting material therein. A corollary object in this regard is to lend assurance that the apparatus components will not act upon the tubular material in an unbalanced manner, thus preventing inadvertent tearing or other damaging of the tubular material.

A further object of the invention is to provide a tetrahedral container of the above-described type having an exterior seam tightly locked closely to the container for rendering the container substantially liquid and gas tight. An ancillary object is to provide a container having a heat sealed seam located exteriorly thereof so that the container may be used for packaging carbonated beverages and the like as well as for liquids such as milk and oil.

It is still another object of the invention to provide a novel tetrahedron-shaped liquid container which has congruent triangular bases and sides and thus always stands right side up. Such a container may be formed using a smaller sheet of material than has conventionally been used to form a given volume container. Another object as regards this aspect of the invention is to form a specially shaped container which occupies only a fraction of the floor-space normally occupied by conventional bottle-type containers, and which is economically manufactured at only a fraction of the cost of producing similarly filled bottles.

Yet another object is to provide a novel liquid container which is light in weight, easily handled, and readily disposable.

Other objects and advantages of the invention will become apparent upon reference to the following description, taken in conjunction with the accompanying drawings, in which:

Figure 1 is an elevation view of an illustrative container forming apparatus embodying the features of the invention, as shown in conjunction with a tube forming apparatus mounted on top thereof. The doors of the container forming apparatus are in open condition and a portion of the shell is broken away to show the apparatus internals.

Fig. 2 is a plan view of the container and tube forming apparatuses shown in Fig. 1.

Figs. 3 and 4 are perspective and plan views, respectively, of an illustrative container formed according to the present invention.

Fig. 5 is an enlarged fragmentary elevation of the internal components of the container forming apparatus shown in Fig. 1, with one set of endless chains and the tube removed to facilitate illustration.

Fig. 6 is a horizontal sectional view taken along the line 6—6 in Fig. 5 showing a pair of cooperating tube sealing elements engaging the tube transversely thereto.

Fig. 7 is a vertical sectional view taken along the line 7—7 in Fig. 6.

Fig. 8 is a vertical sectional view taken along the line 8—8 in Fig. 6 showing cam means employed to positively coordinate the tube sealing elements together in proper relationship and the container severing means built into the tube sealing elements.

Fig. 8a is a reduced size perspective of the cam means shown in Fig. 8, with all other structure removed.

Figs. 9 and 10 are enlarged vertical sectional views taken from Fig. 8 showing retracted and extended positions, respectively, of the container severing knife blade.

Fig. 11 is a fragmentary elevation view of a slip ring and brush assembly employed to supply electrical current to the tube sealing elements.

Fig. 12 is a vertical sectional view taken along the line 12—12 in Fig. 11.

Fig. 13 is a transverse sectional view taken along the line 13—13 in Fig. 9.

Fig. 14 is a plan view of the motor and gearing arrangement used to drive the sets of endless chains.

Fig. 15 is an elevation view taken along the line 15—15 in Fig. 14.

Fig. 16 is a fragmentary enlarged plan view of the container shown in Figs. 3 and 4, showing the external seam in detail.

Fig. 17 is a plan view of a tube centering device mounted in the upper portion of the container forming apparatus.

While the invention is described in connection with a preferred embodiment thereof, it will be understood that it is not intended to limit the invention thereto but rather it is intended to cover all alternative constructions and modifications falling within the spirit and scope of the appended claims.

Turning now to Fig. 1, there is shown for illustrative purposes a container forming apparatus 20 including an outer housing or shell 22 having a pair of doors 24 on each side thereof. The lower portion of the shell 22 includes a gear motor 26 for driving the internal apparatus components and a hopper 28 for catching formed and filled containers as they are severed from the tube. A conveyor 30 shown fragmentarily in Figs. 1 and 2 is provided for carrying the filled containers away from the hopper 28.

Mounted on top of the apparatus 20 is a tube forming apparatus 32 which, as shown, is of the type disclosed in our co-pending application for U.S. Letters Patent, Serial No. 554,167, filed December 20, 1955. Although reference may be had to that co-pending application for details of the construction of the tube forming apparatus 32, it will be helpful for purposes of the present application to briefly describe the operation of this apparatus.

The tube forming apparatus 32 functions to form from a web 34 of sheet material a round tube 36 having an exterior longitudinal seam. In the illustrative tube forming apparatus the web of sheet material has a coating on one side thereof of thermoplastic material, such as wax, polyethylene, polyvinylidene chloride, or the like. Such thermoplastic coating renders the material heat sealable when coated portions thereof are placed against one another. The thermoplastic coating type and weight chosen of course depend to a great extent on the nature of the liquid or other material to be packaged. The sheet material employed may advantageously be formed of paper, cloth, metal foil, plastic materials of various sorts, or the like.

As shown, a roll 38 of heat sealable material carried by a roll stand 40 is arranged adjacent the container forming apparatus 20, and the web 34 is extended over an idler roller 42 carried at the top of a frame 44 employed for supporting the tube forming apparatus 32. The web 34 is then directed downwardly over a novelly shaped tube former plate 46 and past a pair of rollers 48 which tend to push marginal portions of the web together in side-by-side seam forming relationship, the coated web surface being the inner one. The formed web 34 then passes downwardly through a heat sealing assembly 50 effective to heat seal the marginal web portions together and thus form an outstanding longitudinal tube seam. As the tube 36 passes further downwardly and enters the container forming apparatus 20, a seam folding device 52 provided in the top 20a of the apparatus is effective to crease the outstanding tube seam against the tube proper to form a round tube contour.

Before describing in detail the structure and operation of the container forming apparatus 20, it will be helpful to briefly state the function of the apparatus and the nature of its operation. The apparatus 20 is adaptable to form a garland of tetradedron-shaped containers 54 (Figs. 3 and 4) from the continuous round tube 36 which is fed thereto by transversely pinching and sealing the tube successively at right angles at intervals along its length. The sealing of the tube 36 is performed using electrically heated tube sealing elements which act upon the heat-sealable inner tube coating to form a fluid tight seal. The containers 54 are simultaneously filled with liquid or other material to be packaged. Upon completion of the forming and filling operations, the containers are successively sheared one from the other whereupon they drop into the hopper 28 and are thence carried away as desired by means of the conveyor 30.

Referring now to the structure of the illustartive container forming apparatus 20, it will be seen that the machine comprises within the shell 22 and main frame 23, in general, tube centering means 52 provided in the upper portion thereof, means for continuously pulling the tube 36 through the apparatus and for performing the transverse heat sealing operation upon the tube including two pairs of cooperating oppositely disposed endless chain assemblies 60 arranged at right angles to one another, a container filling assembly 62, severing means for detaching the filled and formed containers 54 from the tube 36, and the lower hopper 28.

Upon particular reference to Figs. 1 and 5, it will be observed that the two pairs of endless chain assemblies 60 employed for performing the transverse heat sealing operation upon the tube 36 include in each pair a heater chain assembly 60a and a similar opposing chain assembly 60b for cooperating with the heater assembly to seal the tube. As shown in Fig. 5, each of the chain assemblies 60 comprises a pair of laterally spaced endless chains 62 carried by separate upper idling and lower drive sprockets 64, 66, respectively, the sprockets being keyed to laterally disposed idler and drive sprocket shafts 68, 70, respectively. For supporting each pair of shafts 68, 70 and each chain assembly 60, a perpendicularly arranged mounting plate 72 is suitably secured (not shown) to the main frame 23 of the apparatus 20, and a pair of spaced vertical cam plates 74 are adjustably fastened to support brackets 73 extending perpendicularly from the mounting plate, as by bolt and nut assemblies 76. Other functions of the spaced cam plates 74 are more fully described below.

For driving the endless chain assemblies 60, a gear arrangement 80 is provided, as shown in Figs. 14 and 15. As will be seen, the gear arrangement 80 is mounted on a horizontal plate 82 which divides the upper portion of the apparatus 20 from the lower hopper 28, a square opening 84 being provided in the center thereof for passage therethrough of formed and filled containers 54. The gear motor 26 is arranged in the lower portion of the apparatus shell 22 and is rotatably coupled through a suitable chain drive 86 to a sprocket 88 fixed on the end of one of four driving shafts 92, the latter being journaled in bearing supports 93 to form a square pattern and interconnected at their ends by bevel gear boxes 94. As shown in Fig. 15, each of the shafts 92 has secured thereto a drive gear 96 for engaging an idler gear 97 which is in turn enmeshed with a gear 98 keyed at one end of each of the drive sprocket shafts 70 so that the endless chain assemblies 60 are continuously driven by the gear motor 26.

Referring now to the details of the tube sealing elements, it will be observed from Figs. 5 and 6 that each of the endless chain assemblies 60 carries a plurality of spaced sealing elements or jaws 100 (six in this instance), opposing ones of which are adapted to cooperate in pinching and sealing the tube 36 therebetween. The jaws 100 are arranged laterally between the chains 62 and extend outwardly therefrom to engage the tube 36 traveling downwardly through the apparatus 20. Each of the sealing jaws 100 comprises a body 102 supported at its inner end by the chains 62 and including a brass tube engaging portion 104 extending across its lateral outer end. As shown in Fig. 8, the front and rear surfaces (as the jaws 100 move downwardly through the apparatus 20) of each body portion 104 carry guide pieces 106 for facilitating proper alignment of the sealing jaws with the tube 36.

For mounting each sealing jaw 100 on its respective endless chain assembly 60, a pair of laterally aligned holes 108 are provided at the inner end of the body 102 adaptable to receive therein a pair of opposing transverse support pins 110 carried by opposing links of the chains 62. Such mounting arrangement is found to be advantageous since one or more of the sealing jaws 100 may be removed from and replaced in a chain assembly 60 by simply spreading the spaced drive chains 62 apart manually. This ease of removability feature of the tube sealing jaws 100 is especially advantageous when it is desirable to vary the number of jaws carried by the chain assemblies 60 to thereby change the size of the container being formed.

As shown in Fig. 6, each of the jaws 100 employed with the heater chain assembly 60a is provided with a transverse bore 112 in its outer body portion 104 for receiving therein an elongated cartridge type electrical resistance heating element 114 of any suitable type commercially available. It will be seen that the heater 114 is snugly received by the bore 112 for maintaining heat conducting contact between itself and the body portion 104 which engages the tube 36. In this way, the heater 114 maintains the brass tube engaging jaw portion 104 at a temperature sufficiently high to melt the thermoplastic coating adhering to the interior surfaces of the tube 36.

Electrical current is supplied to the cartridge heaters 114 through suitable electrical lead wires 116 connected between each heater and an electrical supply system 120, the heaters being appropriately grounded to the apparatus frame 23. From Figs. 5 and 11 it will be seen that the electrical supply system 120 comprises for each heater chain assembly 60a a current carrying chain arrangement mounted in parallel with the endless chains 62 and a slip ring and brush assembly 122 at the lower end of the chain arrangement for furnishing current to the latter. In this instance, a pair of current carrying brass chains 124 are disposed side-by-side at one side of each heater chain assembly 60a, being mounted on suitable brass sprockets 126 carried by the upper and lower sprocket shafts 68, 70, respectively. As shown in Figs. 11 and 12 each of the brass sprockets 126 is mounted around an annular core 128 formed of any suitable electrical insulator, the latter being rotatably secured to the sprocket shaft 68, 70. Extending endwise from each outermost lower brass sprocket 126 is an annular slip ring 130, also formed of brass or other electrically conducting material.

For engaging the slip ring 130, a pair of carbon brushes 132 carried by suitable brush holders 134 are provided adjacent the slip ring. The brush holders 134 are swingably mounted on a transverse pin 136 secured to the end of a bracket 138 which is fastened to the apparatus frame 23 as by bolts 140. Electrical lead wires 142 embedded in the brushes 132 are connected to a suitable source of electrical current (not shown). In the illustrative apparatus, the electrical current source employed is a 24-volt direct current battery. Thus electrical current is carried by the brass chains 124 and flows to each of the heating jaws 100 through the lead wires 116 connected between each heater and an adjacent link of the continuously moving brass chain.

In carrying out the invention, positive coordination of opposing tube sealing jaws 100 as they approach one another for sealing the tube 36 is assured through the provision of novelly shaped cam plates 74 which determine the path of motion of the respective jaws. In this instance, the inner end edges of the two spaced vertical cam plates 74 associated with each endless chain assembly 60 comprise cam surfaces 144, 145, and 146, and each of the tube sealing jaws 100 is provided at its inner end with front and rear pairs of lateral rollers 148, 150, respectively, adapted to follow the cam surfaces during operation of the apparatus 20.

Turning now to Figs. 6, 8 and 8a, it is seen that the inner edge of each of the cam plates 74 comprises a vertical cam surface 144 extending over the entire width and most of the length of the plates. The upper portion of the inner edge of each plate 74 is inclined away from the inside of the apparatus 20 and presents two independent cam surfaces 145 and 146 which split the width of the edge. Each of the cam surfaces 145 is straight and comprises the inner lateral portion of the top of the respective cam plate 74 while each of the cam surfaces 146 is arcuate and comprises the outer lateral plate portion. It will be observed that the cam surfaces 146 are at approximately the same inclination with the vertical as are the surfaces 145, but the former are arcuate in contour and displaced somewhat downwardly along the plate from the latter.

In order that the jaw rollers 148, 150 are adaptable to ride over the split cam surfaces 145, 146 of the plates 74, the front rollers 148 are mounted on sealing jaws 100 in advance of rollers 150 and constitute the leading rollers or cam followers, and are relatively widely spaced apart to engage the outer lateral surfaces 146 of the top of the plates and the rear rollers 150 are mounted on said sealing jaws 100 behind the rollers 148 and constitute the trailing rollers or followers and are correspondingly relatively closely spaced for engaging the inner lateral plate surfaces 145.

For guiding the sealing jaws 100 over the cam surfaces 144, 145, 146, a comparatively small third sprocket 152 is provided near the upper portion of each endless chain assembly 60 and arranged to engage the drive chains 62 as they pass over the cam surfaces 145 and 146. As shown in Figs. 5 and 8a, each third sprocket 152 is arranged slightly below and somewhat horizontally displaced inwardly from the associated upper idler sprocket 64, being keyed to a lateral shaft 154 journaled in the cam plates 74 in the same manner as are the main sprocket shafts 68, 70. It will be observed that each of the upper idler sprockets 64 is smaller in diameter than the lower drive sprockets 66, the former being sized to properly conform to the cammed top of the plate 74, while each small guide sprocket 152 is arranged to direct the sealing jaws 100 over the inclined cam surfaces 145, 146, and then to align the chain 62 vertically with the lower sprocket.

Referring now especially to Fig. 8, several positions assumed by a sealing jaw 100 in passing over the cam surfaces 145, 146 are shown in phantom. It will be observed that the cam surfaces 145, 146 are carefully contoured to cause the sealing jaws 100 to effect a gradual pinching action upon the round tube 36 travelling downwardly through the apparatus 20. Thus the opposing sealing jaws 100 slowly move together while passing over the cam surfaces 145, 146, and are positively coordinated for simultaneous pressing action against the tube 36.

For facilitating accurate coordination of the opposing sealing jaws 100, the lateral ends of the jaw body portions 104 are provided with outstanding male and female cooperating locating lugs 156, 158, respectively. As shown in Figs. 5 and 6, the lugs 156, 158 are secured to the jaw body portions 104 by a plurality of dowel pins 160.

When both the front and rear pairs of jaw rollers 148, 150 have passed over the cam surfaces 145, 146 and begin to ride downwardly along the vertical cam surfaces 144, the opposing jaws 100 are brought together to tightly pinch transversely therebetween the tube 36. In this position the male and female locating lugs 156, 158, are effective to lock the opposing jaws 100 together so that the heater jaw portion 104 is then effective to melt the inner thermoplastic tube coatings and to thereby form a transverse seal across the tube. Adjacent transverse tube seals are thus applied at right angles to each other by the normally arranged pairs of chain assemblies 60 as previously described.

In keeping with one of the main objects of the invention, a container severing arrangement (Fig. 8) is provided including a knife assembly 170 built into each of the sealing jaws 100 carried by the chain assemblies 60b and a severing cam assembly 172 for cooperating with the knife assembly in severing formed and filled containers 54 from the tube 36. The cam and knife assemblies 172, 170 are responsive to the position of the sealed containers 54 moving downwardly through the apparatus 20 to automatically sever them after the heat sealing operation has been completed. In this instance, the knife assembly 170 is housed within a lateral recess 174 in each of the severing jaws 100 carried by each chain assembly 60b and the severing cam assembly 172 is mounted between the spaced vertical cam plates 74. From Figs. 6 and 8 it will be seen that the knife assembly 170 comprises a flat lateral knife blade 176 rigidly fixed to a block 178 slidably supported within the recess 174 by suitable bearings 180. Rigid connection between the knife blade 176 and the block 178 is effected by a blade support piece 181 having an L-shaped cross section and extending the entire length of the blade 176, the support piece being suitably secured as by welding to the blade and the block to form a unitary element. As will be observed, the knife blade 176 is retractably insertable through a lateral slot 182 provided in the tube engaging jaw portion 104. A similar lateral slot 183 is provided across the tube engaging face of the opposing heater jaw 100 for receiving the knife blade 176 during the tube cutting action.

For urging the knife assembly 170 outwardly to sever the sealed containers 54, the severing cam assembly 172 includes a pendant cam piece 192 swingably supported between the cam plates 74 by the guide sprocket shaft 154 and adapted to be engaged by a roller type cam follower 194 journaled at the inner end of each knife block 178. From Figs. 6 and 8, it is seen that an elongated cam backing plate 196 spans the spaced vertical cam plates 74 associated with each chain assembly 60b. For resiliently biasing the lower end of the cam piece 192 away from the backing plate 196, a cam push rod 198 is provided extending laterally through a recess 200 in the lower portion of the backing plate 196. This push rod 198 includes a central shoulder 202 interposed between the plate 196 and a helical compression spring 204 which is biased at its other end against a spring pressure plate 206. The pressure plate 206 is carried in a recess 208 in the associated mounting plate 72 by means of a mounting screw 210. In this way, misalignment of the knife blade 176 in the jaw slot 183 will not cause damage to the assembly since the compression spring 204 will allow for the resultant overload and will give if necessary.

Thus, the lower end of the cam piece 192 is normally biased away from the backing plate 196 to present to the jaw mounted follower roller 194 a cam surface slightly inclined with the vertical. In this way the cam follower 194 is gradually biased toward the tube 36 as a given sealing jaw 100 moves downwardly through the apparatus 20. Accordingly the knife block 182 and the knife blade 176 are gradually shifted toward the transverse tube seam being sealed.

Attention is drawn to the provision of a sudden reverse inclination 192a of the surface of the cam piece which begins at the point 193 near its lower end. At a position somewhat above the point 193, the follower roller 194 urges the knife blade 176 outwardly through the slot 182 to sever the associated formed and filled container 54. Then after passing downwardly over the cam point 193 and along the reversely inclined cam surface 192a, the cam follower 194 withdraws the knife blade 176 from the extended position to a retracted position and the jaw 100 is in proper condition for the next downward tube forming and severing cycle.

For assuring positive and rapid return of the knife blade 176 (and the cam follower 194 along the cam surface 192a), a helical compression spring 184 is provided within a lateral opening 185 in the knife mounting block 178 interposed between the block and a shoulder 186a carried by a knife blade guide rod 186. As will be observed from Figs. 9 and 10, the end of the guide rod 186 opposite the shoulder 186a abuts the interior of the jaw portion 104 and is slotted at this end for receiving the knife blade 176. Accordingly, the knife mounting block 178 and the cam follower 194 are biased against the cam piece 192 by the spring 184 to effect follower action of the roller 194 over the cam surface and assure positive return of the knife blade 176.

Preferably, the tube engaging face of each heater jaw portion 104 is knurled for assuring complete sealing of the opposing tube portions 36. The similar tube engaging face of each severing jaw is provided with a lateral outer recess 214 for receiving therein a strip 216 of pliable material, such as silicone rubber or the like for allowing some alignment as between the opposing sealing jaws 100. As shown in Fig. 7, proper alignment as between the opposing sealing jaws 100 (especially during severing of the formed containers) is assured by the provision on the heater jaws 100 of resilient jaw mounting means. Thus, the aligned holes 108 for receiving the jaw support pins 110 are provided in mounting blocks 220 resiliently mounted on the jaw body 102 by means of a stud 222 in screw-threaded engagement therewith and biased away from the body by a helical compression spring 224.

Filling of the containers 54 being formed is accomplished by provision of a tube filling assembly 62, as shown in Figs. 1 and 8. The tube filling assembly 62 comprises a liquid filling pipe 232 supported by the tube forming apparatus 32 and extending concentrically downwardly within the tube 36. The filling pipe 232 preferably terminates somewhat above the uppermost tube sealing joint formed by the apparatus 20 and the liquid flow is so adjusted as to maintain a head of liquid in the tube 36 above the uppermost seal being formed. Suitable high level, low level and positive shut-off liquid level control electrodes are preferably provided as disclosed in more detail in our above-mentioned co-pending patent application for facilitating maintenance of the proper liquid head.

For minimizing foaming of the liquid during filling, the above-mentioned head of liquid preferably covers the lower end 232a of the filling pipe. Thus the liquid flowing from the submerged pipe 232 has no tendency to splash and foaming is suppressed. If desired, however, a suction tube 234 connected to a suitable vacuum source (not shown) may be provided adjacent the filling tube 232 and terminating slightly above the lower end of the latter for removing foam.

In accomplishing another of the objects of the invention, a tube centering device 52 (Fig. 17) is provided in the top 20a of the illustrative container forming apparatus. The centering device 52 serves a dual function in folding over the seam of the tube 36 entering the container forming apparatus 20 and centering the tube therein. As will be seen, the device 52 comprises an oblong ring supported by brackets 238 held in the center of the top 20a by wing nut assemblies 240. A suitable central hole 242 is provided in the top 20a for passage therethrough of the tube 36 being fed to the apparatus. The provision of the tube centering device is particularly important for assuring exact central positioning of the tube 36 with respect to the sealing jaws 100 carried by the endless chain assemblies 60. Such exact positioning enables each of the opposing and cooperating sealing jaws 100 to exert an equal sealing pressure upon the tube 36 thus preventing inadvertent tearing or otherwise damaging of the tube material. Furthermore, the oblong shape of the ring 52 provides space within the ring in which to accommodate a larger tube 36 if desired.

In further carrying out the invention, a tetrahedron shaped container 54 is formed (Figs. 3 and 4) having an exterior seam 54a which is not exposed to the liquid or gas packaged within the container. It will be observed that the formed container 54 has a well defined contour comprising four triangle shaped sides or bases 54b arranged in a pyramid form, with upper and lower transverse seams 54c, 54d, respectively, at right angles to one another.

It has been found that liquids, especially those subject to spoiling, may be stored for indefinite periods of time in the illustrative container without leakage of liquid outwardly or passage of air inwardly. One of the advantageous features of the exterior package seam 54a is that gas containing liquids such as carbonated beverages and the like may be effectively stored over long periods of time without dissipation of the gas pressure within the container.

Attention is also drawn to the locked condition of the seam 54a about the container contour, as shown at 250 in Figs. 3 and 4. The seam 54a is seen to be tightly folded against adjacent container sides 54b and so oriented as to be locked around the tetrahedral edge 54e forming the line of intersection of their planes. It is found that the seam 54a thus locked to the container proper cannot be accidentally snagged or torn outwardly from the container where it might be inadvertently opened.

One of the advantageous features of the invention is that the container size may be varied by simply changing the vertical spacing of the tube sealing elements 100 along the endless chain assemblies 60. Moving the sealing jaws 100 closer together will cause formation of smaller containers while larger containers will result from spacing the jaws wider apart.

We claim:

1. In an apparatus for forming and filling containers using tubular starting material, the combination comprising two pairs of endless chain assemblies arranged around the tubular material at right angles to one another, means for mounting said chain assemblies, means for driving said endless chain assemblies, a plurality of opposing tube sealing elements carried by the endless chain assemblies for cooperating to successively pinch and seal the tubular material at right angles at intervals along its length, means for filling the tubular material between said successive transverse tube seals, extensible means carried by each of the tube sealing elements carried by one pair of endless chain assemblies for severing filled and formed containers from the tubular material, said extensible means including a knife housed within said sealing elements, and cam means connected to said mounting means for extending and retracting said severing knife in accordance with the attainment of a predetermined position in the apparatus of the moving formed container, said cam means being spring biased for protective resilient deflection when cutting motion of the severing knife is obstructed.

2. In an apparatus for forming and filling containers using tubular starting material, the combination comprising two pairs of endless chain assemblies arranged around the tubular material at right angles to one another, means for mounting said chain assemblies, means for driving said endless chain assemblies, a plurality of opposing tube sealing elements carried by the endless chain assemblies for cooperating to successively pinch and seal the tubular material at right angles at intervals along its length, means for filling the tubular material between said successive transverse tube seals, extensible means carried by each of the tube sealing elements carried by one pair of endless chain assemblies for severing filled and formed containers from the tubular material, said extensible means including a knife housed within said sealing elements and spring means for assuring rapid return of the knife after severing, and cam means connected to said mounting means for extending and retracting said severing knife in accordance with the attainment of a predetermined position in the apparatus of the moving formed container, said cam means being spring biased for protective resilient deflection when cutting motion of the severing knife is obstructed.

3. In an apparatus for forming and filling containers using tubular starting material and having two pairs of endless chain assemblies arranged around the tubular material at right angles to one another, means for mounting said chain assemblies, means for driving said endless chain assemblies, a plurality of opposing tube sealing elements carried by the endless chain assemblies for cooperating to successively pinch and seal the tubular material at right angles at intervals along its length, and means for filling the tubular material between said successive transverse tube seals, the combination comprising extensible means carried by each of the tube sealing elements carried by one pair of endless chain assemblies for severing filled and formed containers from the tubular material, cam means connected to the mounting means for extending and retracting the severing means in accordance with the attainment of a predetermined position in the apparatus of the moving formed container, said cam means being spring biased for protective resilient deflection when cutting motion of the severing knife is obstructed.

4. In an apparatus for forming and filling containers using tubular starting material, the combination comprising two pairs of endless chain assemblies arranged around the tubular material at right angles to one another, means for driving said endless chain assemblies, each of the endless chain assemblies including vertically spaced chain carrying drive and idler sprockets, means for mounting each of said chain assemblies, a plurality of opposing tube sealing elements carried by the endless chain assemblies for cooperating to successively pinch and seal the tubular material at right angles at intervals along its length, means for filling the tubular material between said successive transverse tube seals, cam means including a pair of vertically disposed and laterally spaced plates interposed in the path of travel of the tube sealing elements carried by each of the endless chain assemblies, each of said cam plates having differently inclined inner and outer cam surfaces along their upper edge portions, each of said sealing elements carrying front and rear rollers for follower action over said inner and outer cam surfaces for positively coordinating the tube sealing action of the cooperating sealing elements, and guide sprockets on said mounting means engageable with the endless chain assemblies for guiding the sealing elements over said cam plates.

5. In an apparatus for forming and filling containers using tubular starting material, the combination comprising two pairs of endless chain assemblies arranged around the tubular material at right angles to one another, means for driving said endless chain assemblies, each of the endless chain assemblies including vertically spaced chain carrying drive and idler sprockets, means for mounting each of said chain assemblies, a plurality of opposing tube sealing elements carried by the endless chain assemblies for cooperating to successively pinch and seal the tubular material at right angles at intervals along its length, means for filling the tubular material between said successive transverse tube seals, cam means including a pair of vertically disposed and laterally spaced plates interposed in the path of travel of the tube sealing elements carried by each of the endless chain assemblies, each of said cam plates having differently inclined inner and outer cam surfaces along their upper edge portions, each of said sealing elements carrying front and rear rollers for follower action over said inner and outer cam surfaces for positively coordinating the tube sealing action of the cooperating sealing elements, and cooperating lugs on opposing ones of said sealing elements for assuring accurate mating coordination thereof.

6. In an apparatus for forming and filling containers using tubular starting material, the combination comprising two pairs of endless chain assemblies arranged around the tubular material at right angles to one another, means for driving said endless chain assemblies, each of the endless chain assemblies including vertically spaced chain carrying drive and idler sprockets, means for mounting each of said chain assemblies, a plurality of opposing tube sealing elements carried by the endless chain assemblies for cooperating to successively pinch and seal the tubular material at right angles at intervals along its length, means for filling the tubular material between said successive transverse tube seals, means including a pair of vertically disposed and laterally spaced cam plates interposed in the path of travel of the tube sealing elements carried by each of the endless chain assemblies for positively coordinating the tube sealing action of the cooperating sealing elements, extensible means carried by each of the tube sealing elements carried by one pair of endless chain assemblies for severing filled and formed containers from the tubular material, and a pendant cam piece arranged between said spaced cam plates for extending and retracting the severing means in accordance with the attainment of a predetermined position in the apparatus of the moving formed container, said cam piece being mounted for protective resilient deflection when cutting motion of the severing means is obstructed.

7. An apparatus for forming and filling containers from a web of sheet material comprising, in combination, supporting frame means, a former plate mounted on the frame for forming the web into a round shape, roller means cooperating with the former plate for placing the longitudinal edges of the sheet material together in outstanding face-to-face seam forming relation, means for sealing together the longitudinal sheet edges to form an outstanding seam, means for folding over said outstanding seam against the resultant round tube, two pairs of endless chain assemblies mounted in said frame means and arranged around the tube at right angles to one another, means for driving said endless chain assemblies, opposing tube sealing elements carried by the endless chain assemblies for cooperating to draw the tube through the apparatus and to successively pinch and seal the tube at right angles along its length, means for filling the tube between successive transverse tube seals, extensible means carried by each of the tube sealing elements carried by one pair of endless chain assemblies for severing filled and formed containers from the tube, and cam means connected to the frame for extending and retracting the severing means in accordance with the attainment of a predetermined position in the apparatus of the moving formed container, said cam means being mounted for protective resilient deflection when cutting motion of the severing means is obstructed.

8. In an apparatus for forming and filling containers from an elongated tube of sealable material by pinching and sealing together opposite sides of the tube transversely to the longitudinal axis of the tube at intervals along its length, the combination comprising an upstanding machine frame through which the tube may be moved vertically downward, a first opposing pair of mounting elements supported in said machine frame at opposite sides of the path of travel therethrough of the tube, a second opposing pair of mounting elements supported in said machine frame at right angles to said first pair and also arranged at opposite sides of the path of travel of the tube, an endless chain assembly supported on each of said mounting elements for travel in an endless path, each endless chain path including a substantially vertically extending run and the vertically extending runs of the respective chain assemblies being substantially parallel and opposed to each other at opposite sides of the path of travel of the tube, means for driving said endless chain assemblies simultaneously and at the same rate, cooperating means carried by the endless chain assemblies for compressing narrow transverse zones of the opposite sides of the tube into engagement and sealing the same to each other, the cooperating means carried by one of each opposing pair of endless chain assemblies including extensible means for severing filled and formed containers from the tube of sealable material, cam means connected to the mounting elements supporting said last described endless chain assemblies for extending and retracting the extensible severing means in accordance with the attainment of a predetermined position in the machine frame of the moving formed containers, and said cam means being mounted for protective resilient deflection when cutting motion of the severing means is obstructed.

9. The invention as claimed in claim 8 wherein the cam means is an elongated pendant element swingably supported at the upper portion of the mounting elements supporting said last described endless chain assemblies, and said element being biased near its lower end for protective resilient deflection when cutting motion of the severing knife is obstructed.

10. The invention as claimed in claim 9 wherein the elongated pendant cam element comprises a cam surface extending over a major portion of its length and slightly inclined with the vertical for gradually urging the extensible severing means toward the tube being formed into containers, and a second cam surface extending over a minor portion of the cam length and reversely inclined toward the vertical with respect to said first-mentioned cam surface to thereby define between said first and second-mentioned cam surfaces a sharp cam point which point defines the limit of extension of the extensible severing means outwardly from the compressing and sealing means.

11. The invention as claimed in claim 8 wherein the extensible means for severing filled and formed containers includes a knife assembly slidably supported within one of said cooperating sealing means for extension beyond said sealing means in a direction generally perpendicular to the downward path of movement of the tube in the machine frame and said one of said cooperating sealing means includes a roller type cam follower for rolling engagement with said cam means.

12. In an apparatus for forming and filling containers from an elongated tube of sealable material by pinching and sealing together opposite sides of the tube transversely to the longitudinal axis of the tube at intervals along its length, the combination comprising an upstanding machine frame through which the tube may be moved vertically downward, a first opposing pair of mounting elements supported in said machine frame at opposite sides of the path of travel therethrough of the tube, a second opposing pair of mounting elements supported in said machine frame at right angles to said first pair and also arranged at opposite sides of the path of travel of the tube, an endless chain assembly supported on each of said mounting elements for travel in an endless path, each endless chain path including a substantially vertically extending run and the vertically extending runs of the respective chain assemblies being substantially parallel and opposed to each other at opposite sides of the path of travel of the tube, means for driving said endless chain assemblies simultaneously and at the same rate, cooperating means carried by the endless chain assemblies for compressing narrow transverse zones of the opposite sides of the tube into engagement and sealing the same to each other, said cooperating means comprising a set of jaws supported upon each endless chain assembly, the several jaws of each set being spaced apart to aline with a complementary jaw of the opposing chain assembly to flatten said tube and press the opposite sides thereof into engagement, the upper ends of said opposed vertically extending runs being inclined to the path of movement of the tube and approaching each other, each of said upper ends of the opposed vertically extending runs comprising a pair of differently inclined side-by-side inner and outer cam surfaces substantially parallel to one another but displaced from one another in a direction approximately normal to that of the tube being formed, and a pair of leading and trailing followers on each of said cooperating sealing means adapted for sequential moving engagement with said pair of displaced inner and outer cam surfaces, respectively, said leading followers engaging said outer cam surfaces and said trailing followers engaging said inner cam surfaces, said followers and said cam surfaces being arranged with respect to the cooperating sealing means so that the latter follows the contour of the tube as it distorts prior to being compressed by others of the cooperating sealing means acting against the lower portions of the tube.

13. The invention as claimed in claim 12 wherein guide means is provided associated with the upper ends of said opposed vertically extending runs for guiding said cooperating sealing means downwardly over said differently inclined, inner and outer cam surfaces.

14. The invention as claimed in claim 12 wherein cooperating means are provided on said endless chains and on said jaws for detachably and adjustably mounting said jaws on selected links of the respective endless chains for facilitating changing of the spacing of said jaws along the length of the respective chains to quickly vary the size of the containers being formed if desired.

References Cited in the file of this patent

UNITED STATES PATENTS

| | | |
|---|---|---|
| 1,116,618 | Page | Nov. 10, 1914 |
| 2,134,862 | Dunnam | Nov. 1, 1938 |
| 2,237,119 | Smith | Apr. 1, 1941 |
| 2,259,866 | Stokes | Oct. 21, 1941 |
| 2,330,015 | Stokes | Sept. 21, 1943 |
| 2,362,460 | Barnett | Nov. 14, 1944 |
| 2,430,459 | Farrell et al. | Nov. 11, 1947 |
| 2,475,395 | Piazze | July 5, 1949 |
| 2,605,597 | Scheib | Aug. 5, 1952 |
| 2,738,631 | Jarund | Mar. 20, 1956 |
| 2,741,079 | Rausing | Apr. 10, 1956 |

FOREIGN PATENTS

| | | |
|---|---|---|
| 73,361 | Norway | Apr. 5, 1948 |